(12) United States Patent
Fourkas et al.

(10) Patent No.: US 9,370,881 B2
(45) Date of Patent: Jun. 21, 2016

(54) STRUCTURES AND METHODS OF REPLICATING THE SAME

(75) Inventors: John T. Fourkas, Bethesda, MD (US); Christopher Lafratta, Revere, MA (US)

(73) Assignee: The Trustees of Boston College, Chestnut Hill, MA (US)

(*) Notice: Subject to any disclaimer, the term of this patent is extended or adjusted under 35 U.S.C. 154(b) by 2346 days.

(21) Appl. No.: 11/816,257

(22) PCT Filed: Feb. 27, 2006

(86) PCT No.: PCT/US2006/007090
§ 371 (c)(1),
(2), (4) Date: Apr. 7, 2008

(87) PCT Pub. No.: WO2006/093963
PCT Pub. Date: Sep. 8, 2006

(65) Prior Publication Data
US 2009/0020908 A1    Jan. 22, 2009

Related U.S. Application Data

(60) Provisional application No. 60/658,192, filed on Mar. 2, 2005.

(51) Int. Cl.
| B29C 33/40 | (2006.01) |
| B29C 39/02 | (2006.01) |
| B29C 33/38 | (2006.01) |
| B29C 33/48 | (2006.01) |
| B29C 39/36 | (2006.01) |
| B29C 41/14 | (2006.01) |

(52) U.S. Cl.
CPC ........... *B29C 39/026* (2013.01); *B29C 33/3878* (2013.01); *B29C 33/48* (2013.01); *B29C 39/36* (2013.01); *B29C 41/14* (2013.01)

(58) Field of Classification Search
USPC ......................................................... 264/225
See application file for complete search history.

(56) References Cited

U.S. PATENT DOCUMENTS

| 3,830,460 A * | 8/1974 | Beattie .......................... 249/134 |
| 6,156,250 A | 12/2000 | Torres et al. |
| 6,290,500 B1 * | 9/2001 | Morgan et al. ................ 433/173 |
| 2002/0113334 A1 * | 8/2002 | Matsuoka et al. ............ 264/152 |
| 2006/0083661 A1 * | 4/2006 | Chun et al. .................... 422/100 |

* cited by examiner

*Primary Examiner* — Joseph S Del Sole
*Assistant Examiner* — John Robitaille
(74) *Attorney, Agent, or Firm* — Fish & Richardson P.C.

(57) ABSTRACT

The invention features a method for producing replicas of a desired structure, a master and a mold obtained from it for use in such a method. The master includes a desired structure (200) to be reproduced and an additional structure (206, 208) that assists in removal of the master from a mold, e.g. by permitting portions of the mold on opposite sides of the additional structure to flex away from one another when the master is removed from the mold. The method includes immersing the master comprising the desired structure (200) and the additional structure (206, 208) in a molding material (142), solidifying the molding material (142) to make a mold, removing the master from the mold and using the mold to produce replicas of the desired structure (200). For example, the desired structure of the master may include a loop that defines a fluid flow pathway, and the additional structure includes a membrane configured to prevent the molding material from completely passing through the loop when the mold is made from the master.

43 Claims, 15 Drawing Sheets

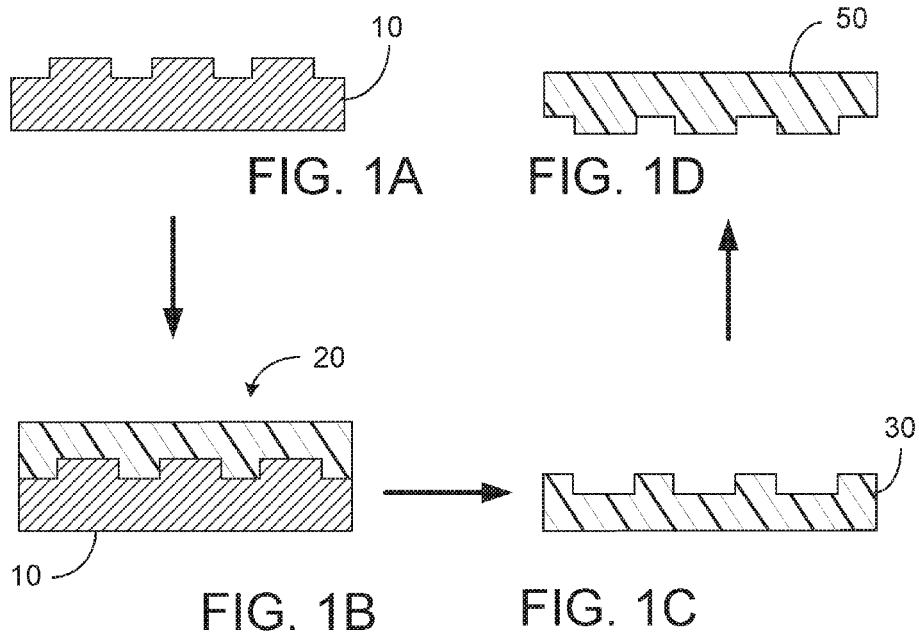
FIG. 1A  FIG. 1D
FIG. 1B  FIG. 1C
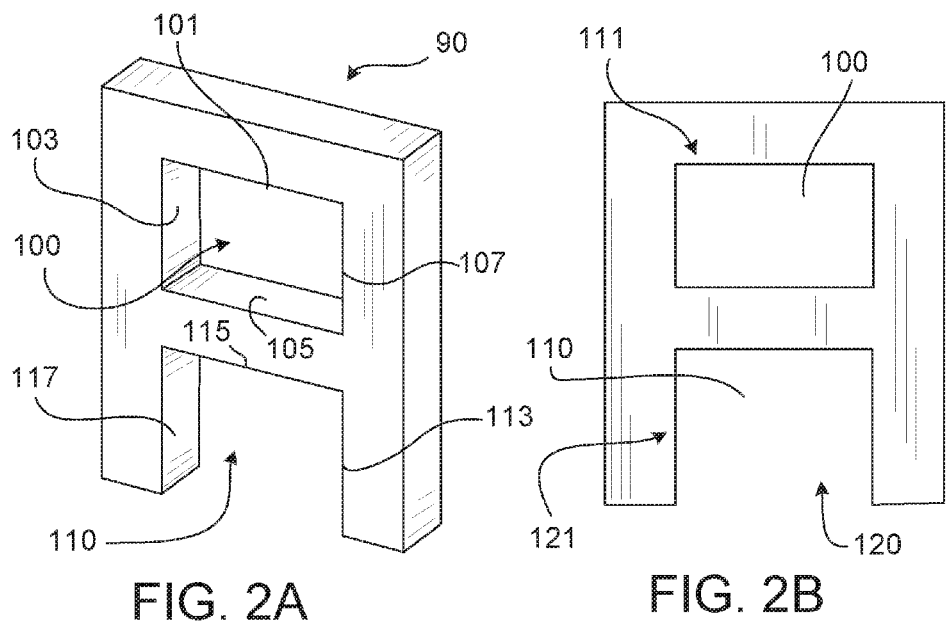
FIG. 2A  FIG. 2B

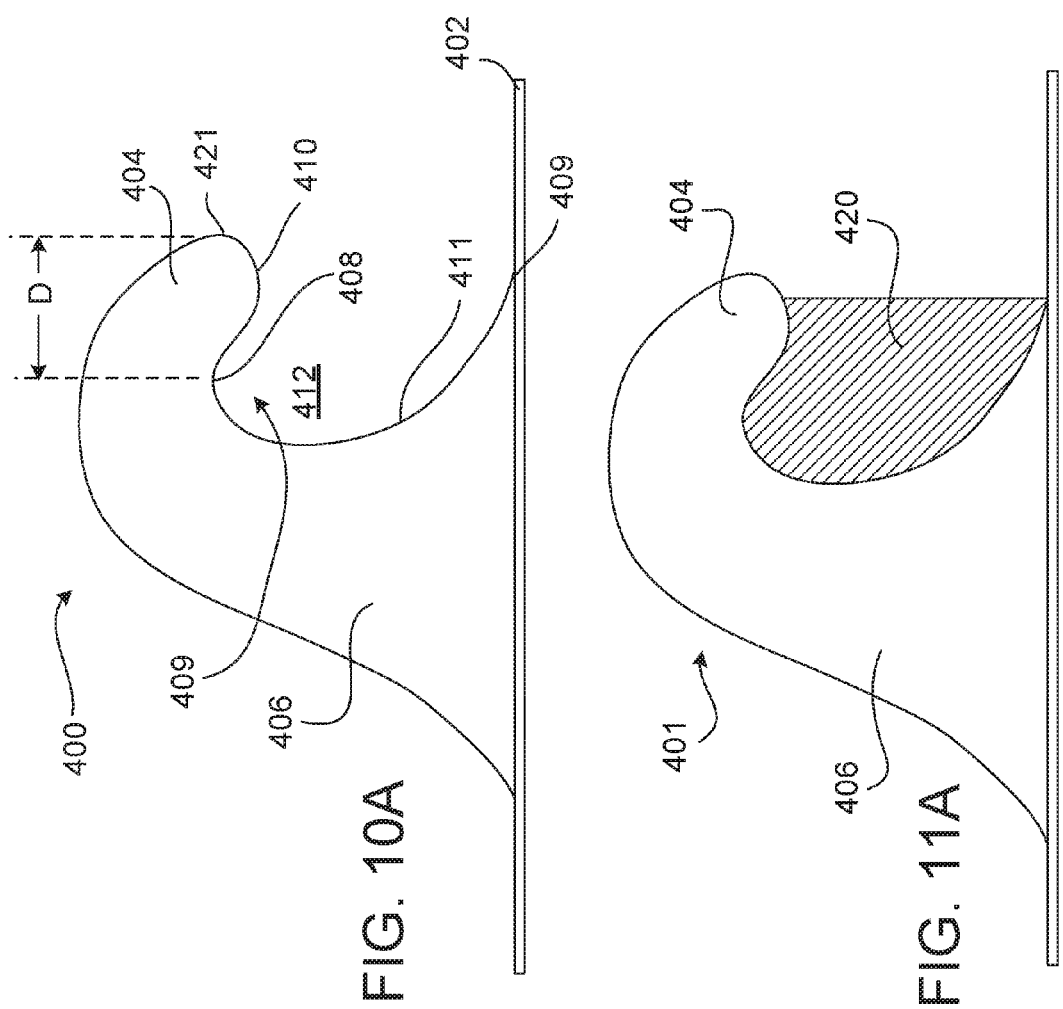
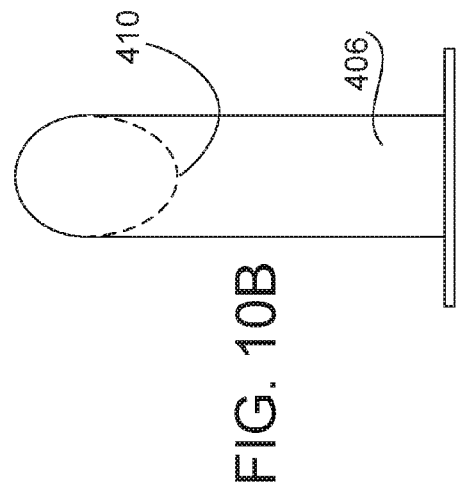
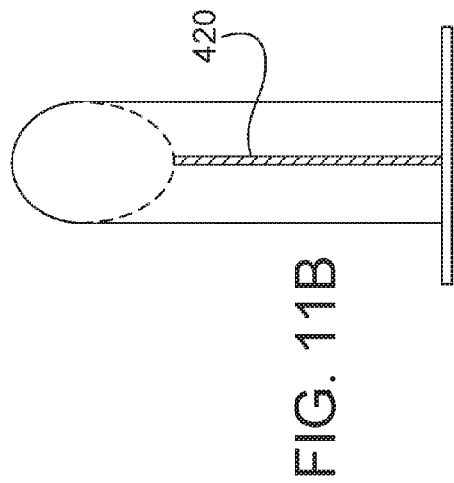
FIG. 10A  FIG. 10B
FIG. 11A  FIG. 11B

STRUCTURES AND METHODS OF REPLICATING THE SAME

CROSS REFERENCE TO RELATED APPLICATIONS

This application claims priority from U.S. Provisional Patent Application No. 60/658,192, filed on Mar. 2, 2005, the contents of which is incorporated herein by reference in its entirety.

STATEMENT OF FEDERALLY SPONSORED RESEARCH

This invention was made with Government support under National Science Foundation (NSF) Grant Numbers ECS-0088438 and ECS-0210497. Thus, the Government has certain rights in the invention.

TECHNICAL FIELD

This invention relates to structures, and to methods of replicating the same, or portions of the same.

BACKGROUND

Three-dimensional structures can be fabricated by a variety of techniques, including machining, stereo-lithography and multi-photon absorption polymerization (MAP). Such three-dimensional structures are often referred to as a "masters" when they are used in a replication process. Replicating masters can be achieved by using transfer molding, or micro-transfer molding (μ-TM) when features to be replicated are small, e.g., less than 500 μm. Micro-transfer molding has been reviewed by Whitesides in *Accounts of Chemical Research*, 35 (7), 491-499 (2002).

Referring to FIGS. 1A, 1B, 1C and 1D, a mold 30 can be made from a master 10, by pouring a first molding material, e.g., a silicone molding material, e.g., poly(dimethylsiloxane) (PDMS), about master 10, and then allowing the molding material to set, e.g., vulcanize, producing a separable master-mold complex 20. Separation of complex 20 frees master 10 and mold 30. Replica 50 can be prepared from mold 30 by pouring a second molding material, e.g., a polyurethane or an acrylic molding material, into mold 30, and then allowing the second molding material to set, producing a separable replica-mold complex (not shown). Separation of the replica-mold complex frees mold 30 and replica 50. Master 10 can be used a number of times to produce a number of molds, and the resulting molds can be used a number of times to produce a number of replicas.

SUMMARY

Generally, structures and methods of replicating the same, or portions of the same, are disclosed. For example, in some methods for producing replicas of a desired structure, a master is provided that includes the desired structure and an additional structure or feature that assists in removal of the master from a mold. For example, the desired structure can define a fluid flow pathway and the additional structure a membrane, e.g., a thin wall, blocking the fluid flow pathway, or the desired structure can have reentrant features and the additional structure a projection extending outwardly from the desired structure.

In general, in one aspect, the invention features a method for producing replicas of a desired structure. The method includes: (i) providing a master including the desired structure and additional structure different from the desired structure; (ii) immersing the master in a molding material; (iii) solidifying the molding material to make a mold of the master; (iv) removing the master from the mold, wherein the additional structure in the master assists in the removal of the master from the mold; and (v) using the mold to produce the replicas of the desired structure.

Embodiments of the method may include any of the following features.

The desired structure may define a fluid flow pathway and the additional structure may include a membrane blocking the fluid flow pathway.

For example, the fluid flow pathway may pass through the desired structure, or the desired structure may include a loop that defines the fluid flow pathway, and the membrane may be configured to prevent the molding material from completely passing through the loop. For example, the loop may be a closed loop. Alternatively, the additional structure may include a membrane extending away from the desired structure.

The additional structure may be a membrane that is thin compared to a thickness of the desired structure. For example, the membrane may have a thickness less than about 2 micron. In another example, a ratio of the thickness of the desired structure to that of the membrane may be greater than about 5:1.

The desired structure may have a cross-sectional dimension less than about 50 microns.

The master may be removed from the mold along a first direction, and the additional structure may assist in the removal of the master from the mold by preventing the molding material from completely surrounding a portion of the desired structure in any plane including the first direction. For example, the additional structure may be a membrane preventing the molding material from completely passing through a loop in the desired structure. Furthermore, the additional structure may assist in the removal of the master from the mold by permitting portions of the mold on opposite sides of the additional structure to flex away from one another when the master is removed from the mold.

The master may be removed from the mold along a first direction, and the additional structure may extend into the mold in a direction opposite the first direction. For example, the additional structure may assist in the removal of the master from the mold by permitting portions of the mold on opposite sides of the additional structure to flex away from one another when the master is removed from the mold.

Using the mold to produce the replicas may include filling regions of the mold corresponding to the desired structure of the master with a replication material while not substantially filling regions of the mold corresponding to the additional structure of the master with the replication material. For example, the regions of the mold corresponding to the desired structure may be substantially larger than the regions of the mold corresponding to the additional structure, and the replication material may have a viscosity that prevents the substantial filling of the regions of the mold corresponding to the additional structure. For example, a ratio of a dimension of the desired structure to a dimension of the additional structure may be greater than about 5:1.

Using the mold to produce the replicas may further include filling selected regions of the mold with a replication material by applying a force to the mold to preferentially fill the selected regions. For example, the force may be applied through a vacuum or by a mechanical clamp. The selected regions of the mold may correspond to the desired structure, and not the additional structure.

Using the mold to produce the replicas of the desired structure may include using the mold to produce a replica of the master including the desired structure and the additional structure, and removing the additional structure from the replica of the master. For example, removing the additional structure from the replica may include sonicating the replica to weaken an attachment of the additional structure to the desired structure in the replica.

In another aspect, the invention includes a mold or a replica made by the above method.

In general, in another aspect, the invention includes a master for use in a method for producing replicas of a desired structure. The master includes the desired structure and additional structure different from the desired structure, wherein the additional structure in the master assists in a removal of the master from a mold used to produce the replicas of the desired structure.

The master may include any of the following features.

The desired structure may have a cross-sectional dimension less than about 50 microns.

The desired structure may define a fluid flow pathway and the additional structure may include a membrane blocking the fluid flow pathway. For example, the desired structure may include a loop that defines the fluid flow pathway, and the membrane may be configured to prevent a molding material from completely passing through the loop when the mold is made from the master.

The additional structure may include a membrane extending away from the desired structure.

The additional structure includes a membrane having a thickness less than about 2 micron. A ratio of a thickness of the desired structure to that of the membrane may be greater than about 5:1.

The master may further include any of the features described above in connection with the method.

In general, in another aspect, the invention features a mold of a master for use in a method for producing replicas of a desired structure, wherein the master includes the desired structure and additional structure different from the desired structure, wherein the additional structure in the master assists in a removal of the master from a mold used to produce the replicas of the desired structure, wherein the mold includes a cavity in a shape of the master.

The mold may include any of the following features.

A region of the cavity corresponding to the desired structure may have a cross-sectional dimension less than about 50 microns.

The desired structure may define a fluid flow pathway and the additional structure may include a membrane blocking the fluid flow pathway. For example, the desired structure of the master may include a loop that defines the fluid flow pathway, and the membrane may be configured to prevent molding material from completely passing through the loop when the mold is made from the master.

The additional structure may include a membrane extending away from the desired structure.

The additional structure may include a membrane having a thickness less than about 2 micron. A ratio of a thickness of the desired structure to that of the membrane may be greater than about 5:1.

The mold may further include any of the features described above in connection with the method.

Embodiments and/or aspects may include any one or combination of the following advantages. The structures and methods described herein allow for replication of small, complex three-dimensional structures. For example, structures having a maximum transverse dimension of less than 100 μm, e.g., 75 μm, 50 μm or less, e.g., 25 μm, can be replicated with high fidelity and in large numbers. Structures having fluid flow pathways defined therethrough can be produced and masters can be replicated that have high aspect ratios and/or reentrant features.

The structures and methods described herein are useful, e.g., in the fields of microelectronics and microfluidics. For example, the structures can be used in microelectromechanical systems (MEMS) devices, e.g., micro-inductors, and medical devices.

All publications, patent applications, patents, and other references mentioned herein are incorporated by reference in their entirety. In case of conflict, the present specifications control.

Other features and advantages of the invention will be apparent from the following detailed description, and from the claims.

DESCRIPTION OF DRAWINGS

FIGS. 1A, 1B, 1C and 1D schematically illustrate making a replica from a master.

FIGS. 2A and 2B are perspective and a side views, respectively, of a structure having two fluid flow pathways defined therethrough.

FIGS. 10A and 10B are side and front views, respectively, of a hook-shaped master.

FIGS. 11A and 11B are side and front views, respectively, of a hook-shaped master having a blocking wall.

DETAILED DESCRIPTION

Figure 3A:
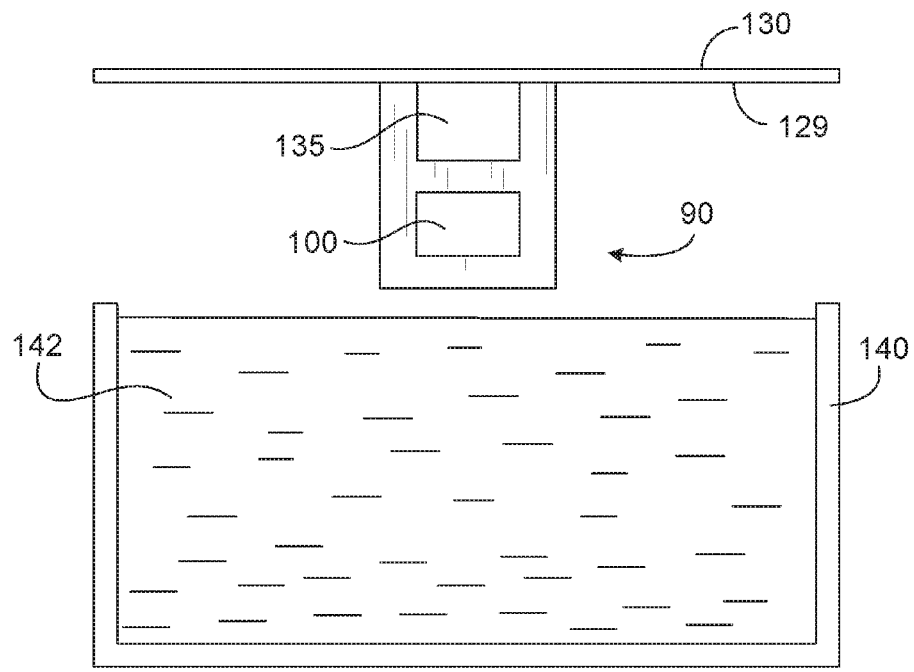
FIG. 3A is a schematic side view of a structure having two fluid flow pathways defined therethrough, the structure being positioned above a molding material contained by a mold frame.

In general, structures, methods and molds are disclosed. For example, masters useful for producing replicas of a desired structure include the desired structure and an additional structure or feature different from the desired structure. The additional structure or feature in the master, e.g., a membrane blocking a fluid flow pathway, assists in removal of the master from a mold, e.g., by preventing mold-lock or by making the mold more flexible.

Referring to FIGS. 2A and 2B, which are perspective and side views, respectively, an A-shaped structure 90 having flat sides includes a first and a second fluid flow path 100, 110 defined through the structure. First fluid flow path 100 is a closed flow path in that it is entirely bounded by structure 90. Walls 101, 103, 105 and 107 of flow path 100 define a closed loop 111. Second fluid flow path 110 is an open flow path in that it is not completely bounded by structure 90, but is open at a side 120. Walls 113, 115 and 117 of second flow path 110 define an open loop 121.

Figure 3B:
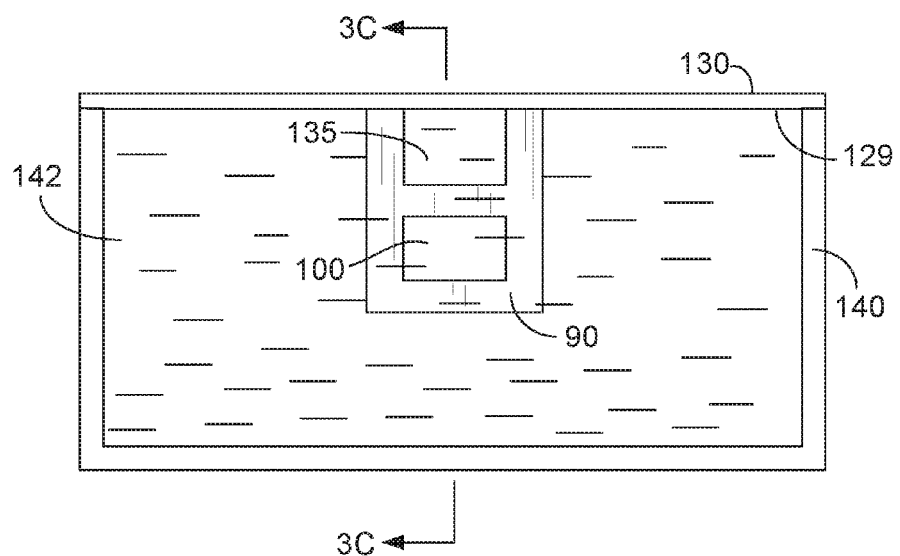
FIGS. 3B and 3C are schematic side and cross-sectional views, respectively, of the structure of FIG. 3A immersed in the molding material.
Figure 3C:
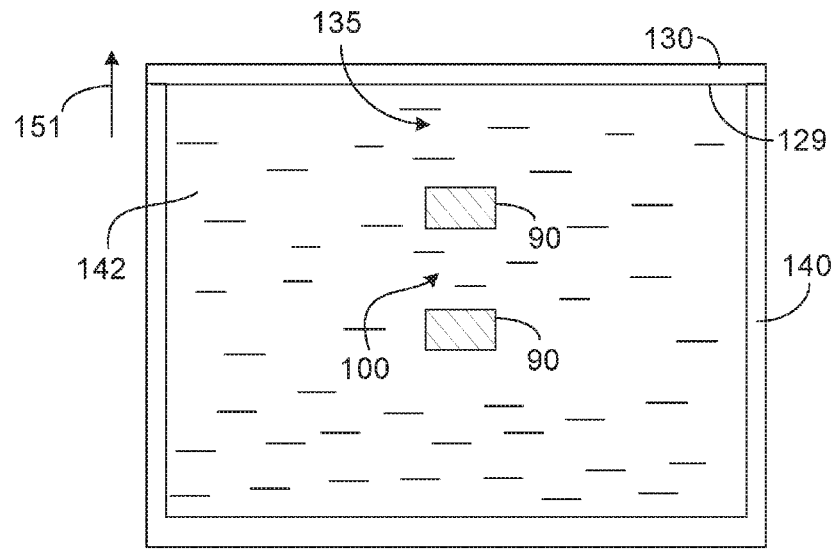

Referring to FIG. 3A, structure 90 extends downwardly from and is integral with, e.g., bonded to or contiguous with, a front surface 129 of a base 130, such that two closed fluid flow paths (closed loops) are defined. The first flow path 100 is bounded entirely by structure 90, and a second fluid flow path 135 is bounded by structure 90 and the front surface 129 of the base 130. FIG. 3A shows structure 90 positioned above an unset, e.g., unvulcanized, liquid molding material 142, e.g., poly(dimethylsiloxane), contained within a mold frame 140. Referring now to FIGS. 3B and 3C, which are side and cross-sectional views, respectively, after immersion of structure 90 into the unset, liquid molding material 142, the liquid molding material 142 flows into fluid flow paths 100, 135, and through structure 90. After the liquid molding material 142 sets and solidifies, e.g., vulcanizes, a solid material, e.g., cross-linked poly(dimethylsiloxane), passes though structure 90 via flow paths 100, 135, making it impossible to remove structure 90 from the set material by applying a force in an upwardly direction (indicated by arrow 151) without breaking the solid mold material or structure 90. This phenomenon is often referred to as "mold-lock." We have discovered certain structures and methods that effectively circumvent this mold-lock phenomenon, as described below.

Figure 4A:
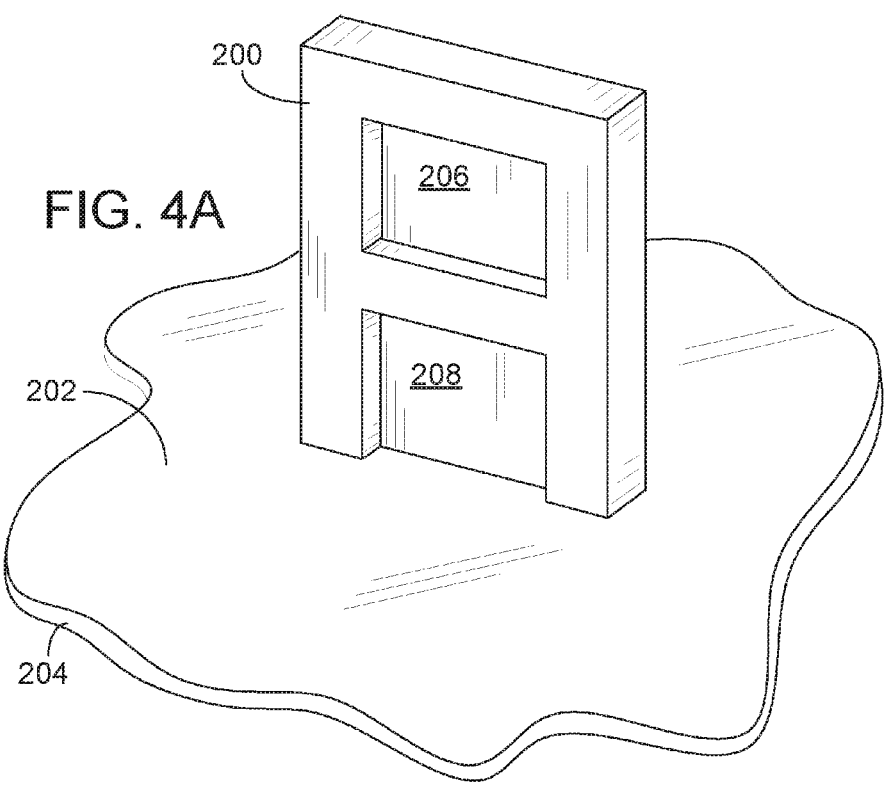
FIGS. 4A, 4B and 4C are perspective, side and cross-sectional views, respectively, of a structure having walls blocking fluid flow pathways through the structure.
Figure 4B:
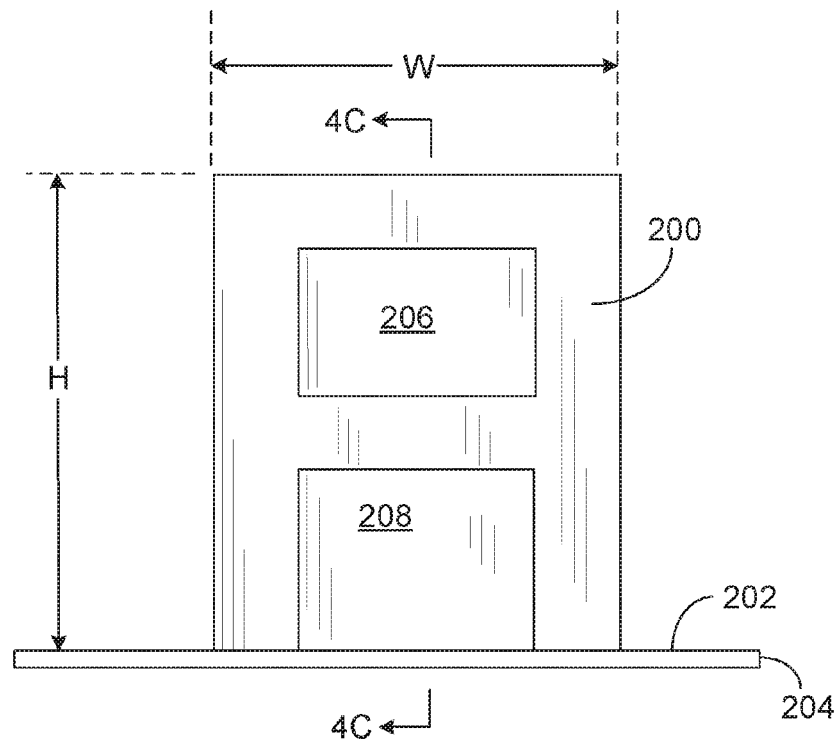
Figure 4C:
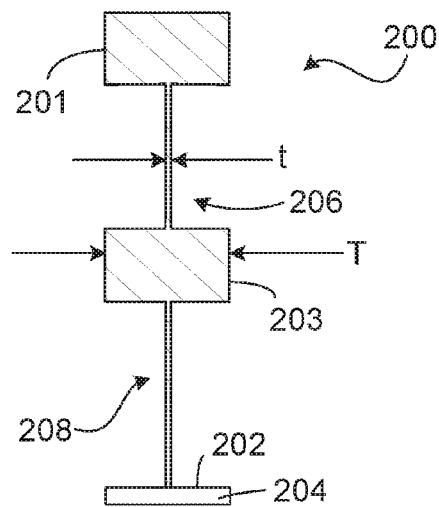

Referring to FIGS. 4A, 4B and 4C, which are perspective, side and cross-sectional views, respectively, structure 200 extends upwardly from and is integral with a front surface 202 of a base 204, e.g., a base made of glass or plastic. Structure 200 has two walls 206 and 208 that bisect each flow path, preventing fluid flow through structure 200.

Referring particularly to FIGS. 4B and 4C, in some embodiments, structure 200 has a maximum height (H) of less than less than about 250 µm, e.g., 200 µm, 150 µm, 100 µm, 75 µm, 50 µm, 25 µm or less, e.g., 10 µm, a maximum lateral dimension (W) of less than about 200 µm, e.g., 150 µm, 100 µm, 75 µm, 50 µm, 25 µm or less, e.g., 10 µm, and a maximum cross-sectional dimension (T), taken perpendicular to base 204, of less than about 100 µm, e.g., 75 µm, 50 µm, 25 µm or less, e.g., 10 µm. In some embodiments, each wall has a thickness (t) of less than 25 µm, e.g., 20 µm, 15 µm, 10 µm, 7.5 µm, 5.0 µm, 2.5 µm, 2.0 µm, 1.0 µm, 0.5 µm, 0.25 µm or less, e.g., 0.1 µm.

In particular embodiments, a ratio of the cross-sectional dimension (T) to the wall thickness (t) is greater than about 5, e.g., 7.5, 10, 15, 25 or more, e.g., 50. For example, in some implementations, the maximum cross-sectional dimension (T) is less than 50 µm and each wall 206, 208 has a wall thickness (t) of less than 2 µm, e.g., 1 µm, 0.5 µm or less, e.g., 0.25 µm.

In some embodiments, structure 200 is fabricated using multi-photon absorption polymerization (MAP). In a typical procedure, a cross-linkable resin, e.g., an acrylic resin, e.g., a mixture of ethoxylated trimethylolpropane triacrylate and tris(2-hydroxyethyl)isocyanurate, both available from Sartomer Company, Exton, Pa., is mixed with a photo-initiator, e.g., ethyl-2,4,6-trimethylbenzoylphenylphosphinate (Lucirin® TPO-L) available from BASF. The mixture of the cross-linkable resin and photo-initiator is then placed atop a substrate, e.g., a glass microscope slide that has been treated with adhesion promoter, e.g., (3-acryloxypropyl)-trimethoxysilane. The adhesion promoter promotes adhesion between the cross-linkable resin and the substrate. In such embodiments, the substrate is base 204 shown in FIG. 4B. Polymerization of the cross-linkable resin is performed using a tunable laser oscillator, e.g., a Ti:Sapphire laser oscillator, such as the Mira™ Optima™ 900-F laser oscillator with 100 fs pulses available from Coherent, Inc., Santa Clara, Calif. Typically, laser output is directed through a Faraday isolator, a prism dispersion compensator and a beam expander before being introduced through a reflected light port to an upright microscope, e.g., a Zeiss AxioPlan2. Position of a focal volume is controlled with a computerized stage, e.g., a LUDL BioPrecision motorized microscope stage available from SpectraCore, Inc. If desired, the sample can be visualized during fabrication by using a charge-coupled camera. After polymerization is complete, unexposed resin that is not part of the fabricated structure 200 is washed away with a solvent, e.g., ethanol. Additional details regarding MAP have been described by Fourkas in *J. Appl. Phys.,* 95(11), 6072-6076 (2004) and *J. Phys. Chem. B,* 108, 11256-11258 (2004).

Figure 5A:
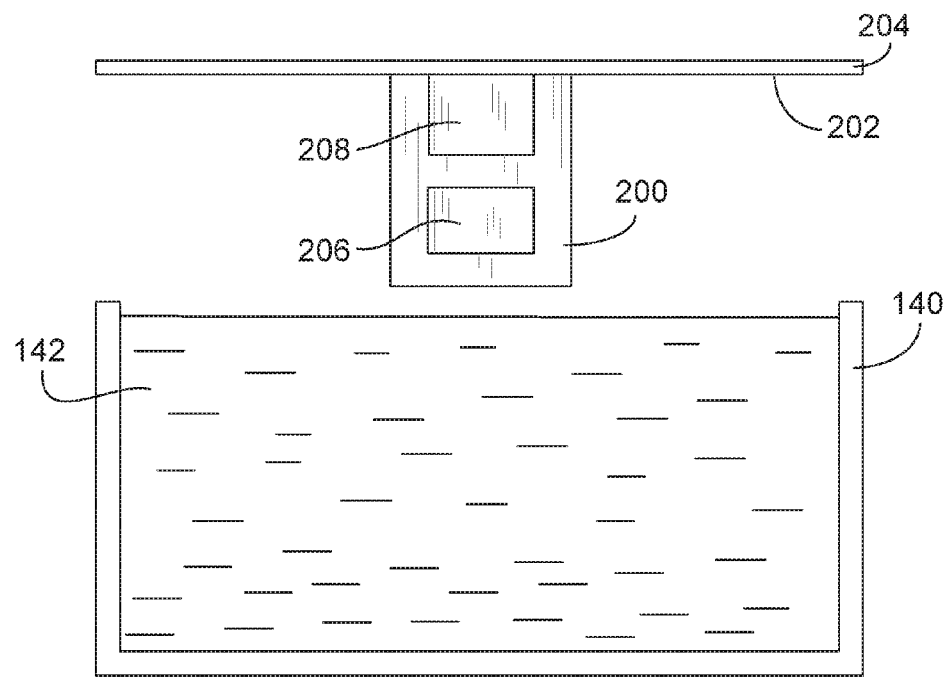
FIG. 5A is a schematic side view of the structure of FIG. 4B positioned above a molding material contained by a mold frame.
Figure 5B:
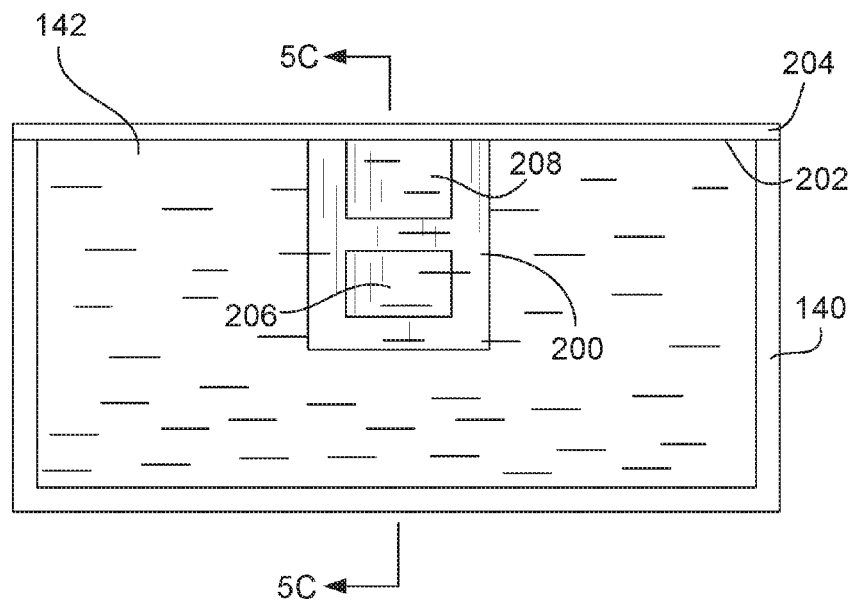
FIGS. 5B and 5C are schematic side and cross-sectional views, respectively, of the structure of FIG. 4B immersed in the molding material.
Figure 5C:
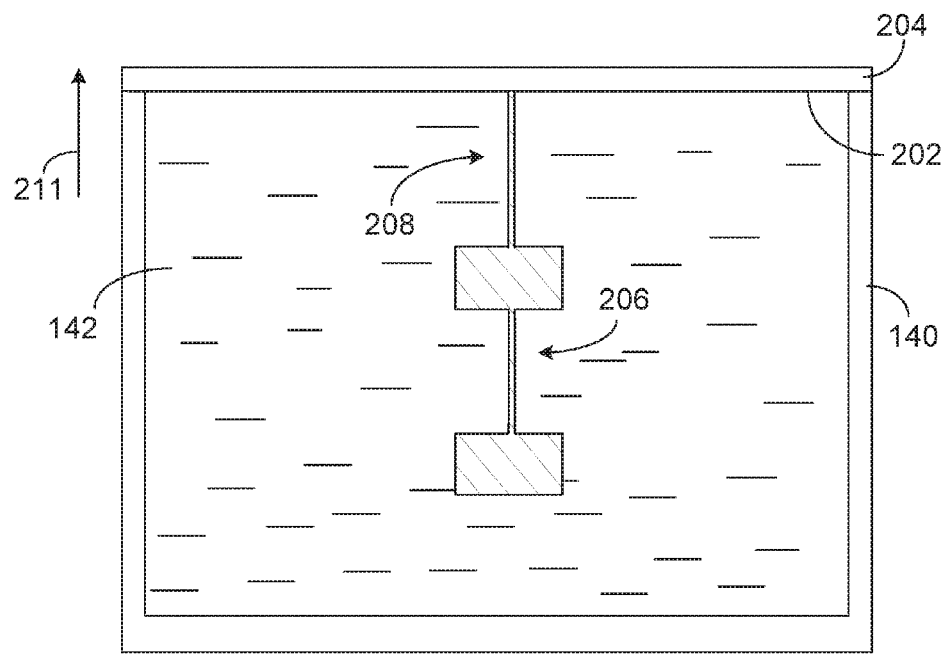

FIG. 5A shows inverted structure 200 positioned above unset, liquid molding material 142 contained within mold frame 140. Referring now to FIGS. 5B and 5C, which are side and cross-sectional views, respectively, when structure 200 is immersed into the liquid molding material 142, the liquid molding material is prevented from flowing through structure 200 by blocking walls 206 and 208. As a result, after the liquid molding material sets, it is possible to remove structure 200 from the set material when the set material is relatively soft, e.g., has a Shore A hardness of less than about 100, by applying a force in an upwardly direction (indicated by arrow 211). Walls 206 and 208 effectively circumvent the mold-lock phenomenon described above.

Figure 6A:
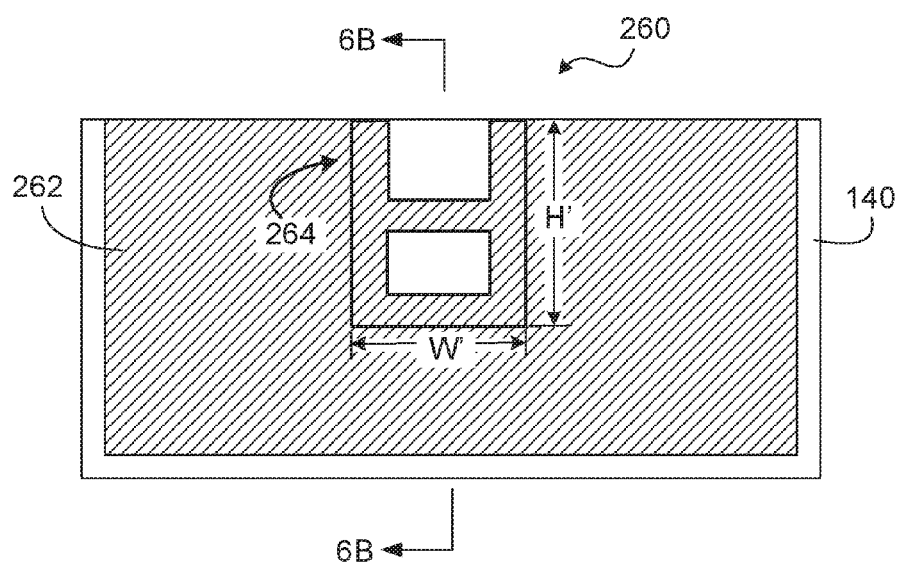
FIGS. 6A and 6B are side and cross-sectional views, respectively, of a mold fabricated using the structure of FIG. 4B.
Figure 6B:
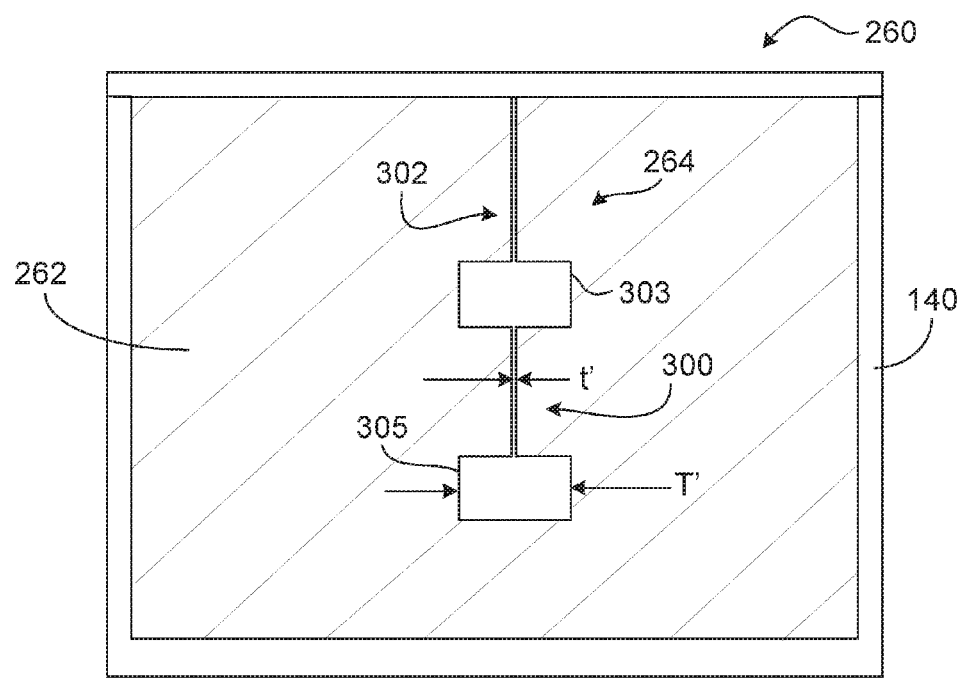

Referring to FIGS. 6A and 6B, which are front and cross-sectional views, respectively, after removal of structure 200 from the set molding material 262, a mold 260 is produced that can be used to make replicas. Mold 260 includes a cavity 264 surrounded by set molding material 262. Cavity 264 in cross-section includes two relatively thin regions 300 and 302, and two relatively thick regions 303 and 305. Thin regions 300 and 302 correspond to walls 206 and 208, respectively, of structure 200, while thick regions 303 and 305 correspond to regions 201 and 203, respectively of structure 200 (FIG. 4C).

Referring to FIGS. 4C, 6A and 6B, dimensions of cavity 264 are approximately equal to the corresponding dimensions of the master from which the cavity is formed. Namely, (H) is approximately equal (H'), W is approximately equal to (W'), (T) is approximately equal to (T') and (t) is approximately equal to (t'). Any differences in dimensions arise from shrink in the molding material. For a cure at room temperature, typical shrinkage observed in an amorphous molding material, e.g., poly(dimethylsiloxane), is between about 0.25 percent and about 0.5 percent, and typical shrinkage observed in a crystalline molding material is between about 0.5 percent and about 2 percent. At higher cure temperatures, typical shrinkage can be up to about 5%.

In some embodiments, the liquid molding material is poly (dimethylsiloxane). Poly(dimethylsiloxane) is often supplied as two components, a base and a curing agent. A suitable poly(dimethylsiloxane) is Sylgard® 184 silicone elastomer available from Dow Corning. Cross-linking occurs when silicon hydride groups present in the curing agent react with vinyl groups present in the base. Sylgard® 184, mixed at 10 volume parts base to 1 volume part curing agent, has an initial viscosity of about 3,900 centipoise, an initial specific gravity of about 1.03 g/cm$^3$, a room temperature working time of about 2 hours, a room temperature cure time of about 48 hours and a heat cure time of about 45 minutes at 100° C. The cured elastomer has a Shore A hardness durometer of about 50. We have found that Sylgard® 184 replicates with high fidelity features of a master, and its low surface energy of reduces sticking to the master. In addition, its softness and flexibility aids in removal of masters without damaging the mold or the master.

Referring particularly to FIG. 6B, mold 260 can be used to mold replicas. When it is desired to produce structures having fluid flow pathways defined through the structure, molding conditions and/or the mold are adjusted such that regions 300 and 302 of cavity 264 are not filed with unset, liquid replication material. For example, structure 90 of FIG. 2A can be produced by filling all regions of mold cavity 264, except regions 300 and 302. When it is desired to produce structures having walls blocking fluid flow pathways through the structure, molding conditions are adjusted such all regions of mold cavity 264 are filled, including regions 300 and 302 of cavity 264, with unset, liquid replication material. For example, structure 200 of FIG. 4A can be replicated by filling entire mold cavity 254. In embodiments where regions 300 and 302 are filled, the resulting replicas can be used to produce structures having fluid flow pathways defined through the structure by removing the walls in a secondary operation. For example walls can be removed by sonicating the replica having walls blocking fluid flow pathways to weaken an attachment of the walls to the structure, or by ablating the undesired walls with a laser. Additional removal techniques include plasma etching and removal by solvent evaporation induced capillary forces.

In an exemplary embodiment, Sylgard® 184 silicone elastomer molding material is prepared, and then centrifuged to remove entrapped air bubbles. An O-ring that has been greased, e.g., with silicone grease, is placed around a master that extends outwardly from a base. Silicone molding material is poured in over the master to fill the volume encompassed by the O-ring, the O-ring becoming the mold frame in the set up mold. In an exemplary embodiment in which a single master is used, a final mold is 3 mm deep and has a transverse cross-sectional area of approximately 3 cm$^2$. To cure the mold, the entire master-molding material assembly is placed in an oven at 150° C. for 15 minutes, and then the assembly is removed from the oven to cool. The set up mold is carefully peeled off the master. Replicating material, e.g., acrylic replicating material, is poured into the mold and a substrate, e.g., a glass slide, is pressed against the mold so that the replica becomes integrally bound to the substrate when the replicating material sets. Setting the replicating material can be achieved by exposing the replicating material in the mold to radiation, e.g., a ultra-violet light source. Removal of the replica is achieved by pulling on the substrate.

In some embodiments, should it be desired to not fill regions 300 and 302 of cavity 264, hydrophobicity of the set molding material, as determined by contact angle θ (ASTM D 5946-04), viscosity of the liquid replication material, thickness (t') of regions 300 and 302, and pressure within the cavity are adjusted such that the liquid replication material is not drawn into regions 300 and 302 of cavity 264 by capillary forces. For example, regions 300 and 302 of cavity 264 are not filled when the set molding material has a contact angle θ of greater than 95 degrees, e.g., 105, 110, 125, 140 or greater, e.g., 170 degrees, the viscosity of the molding material is greater than 20,000 centipoise, the thickness (t') of regions 300 and 302 is less than about 2 μm, e.g., 1.50 μm, 1.25 μm, 1.00 μm, 0.75 μm or less, e.g., 0.5 μm, and pressure within the cavity is approximately nominal atmospheric pressure. Mechanical forces can also be applied to mold 264 when it is desired not to fill regions 300 and 302 of mold 264. For example, mold 264 can be clamped to force regions 300 and 302 to collapse, or a vacuum source can be applied cavity 264 such that regions 300 and 302 collapse. Should it be desired to fill regions 300 and 302 of cavity 264, hydrophobicity of the set molding material, viscosity of the replication material, thickness (t') of regions 300 and 302, and pressure within the cavity can be adjusted to achieve this goal. For example, regions 300 and 302 of cavity 264 are filled when the molding material has a contact angle θ of between about 150 degrees and about 176 degrees, the viscosity of the replication material is less than 5000 centipoise, the thickness (t') of regions 300 and 302 is greater than about 2 μm, e.g., 2.50 μm, 3.00 μm, 4.00 μm, 5.00 μm or more, e.g., 10.0 μm, and pressure within the cavity is approximately nominal atmospheric pressure.

Figure 7A:
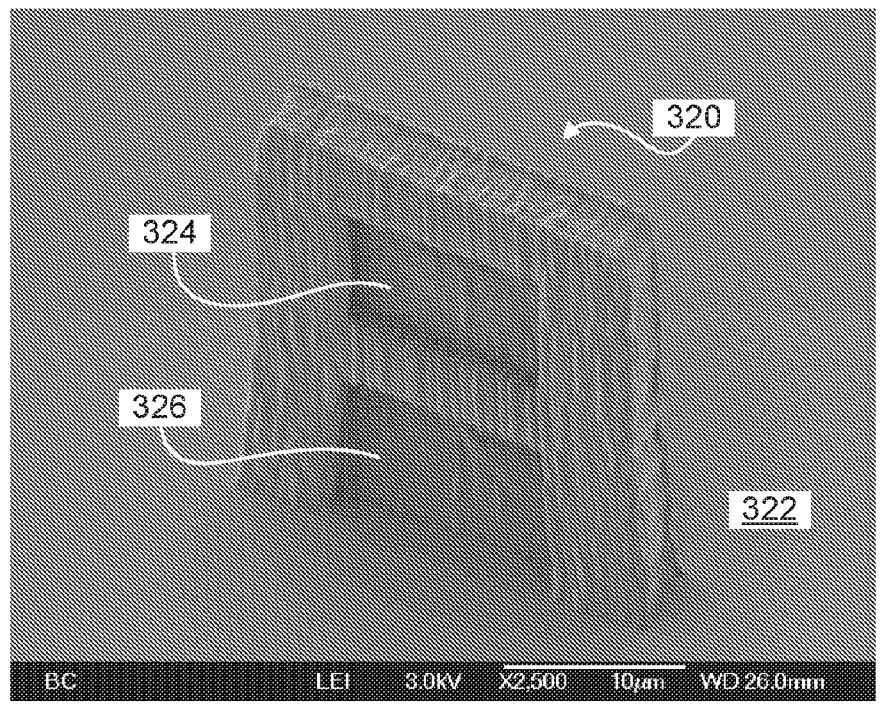
FIG. 7A is a scanning electron micrograph at 2500 times magnification of a structure made by multi-photon absorption polymerization (MAP) having walls blocking fluid flow pathways through the structure.
Figure 7B:
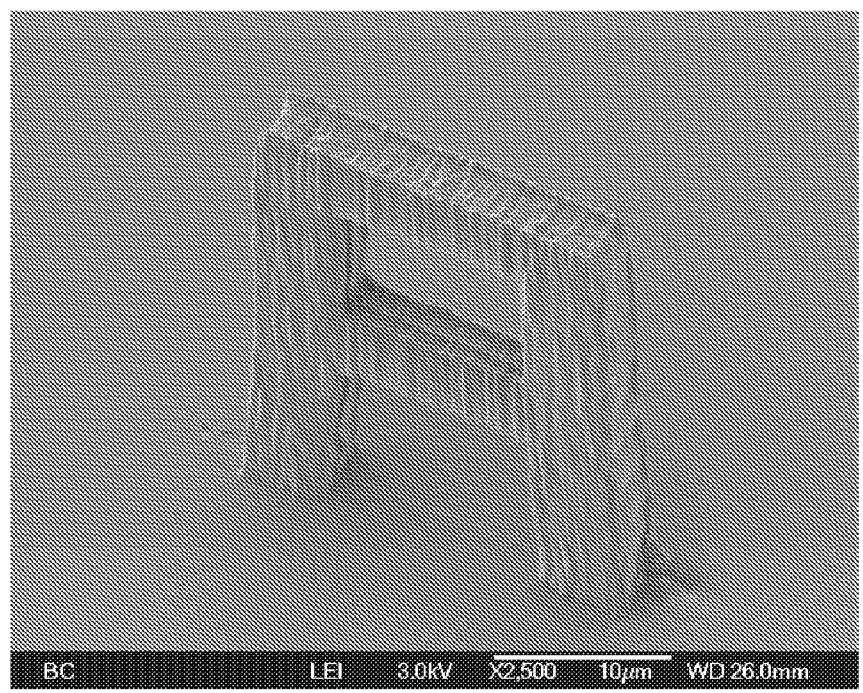
FIG. 7B is a scanning electron micrograph at 2500 times magnification of a replica of the structure of FIG. 7A without replication of blocking walls.

FIG. 7A is a scanning electron micrograph taken at 2500 times magnification of a master 320 made by multi-photon absorption polymerization (MAP) of a mixture of ethoxylated trimethylolpropane triacrylate and tris(2-hydroxyethyl) isocyanurate in the presence of ethyl-2,4,6-trimethylbenzoylphenylphosphinate (Lucirin® TPO-L) as photo-initiator. Master 320 has fluid flow pathway blocking walls 324 and 326 that are each about 0.5 μm thick. Master 320 extends upwardly from a top surface 322 of a glass microscope slide approximately 15 μm, has a maximum lateral dimension of approximately 20 μm, and a maximum thickness of about 3 μm. FIG. 7B is a scanning electron micrograph taken at 2500 times magnification of a replica of master 320. In this particular embodiment, replication occurred without replication of blocking walls 324 and 326.

Figure 8A:
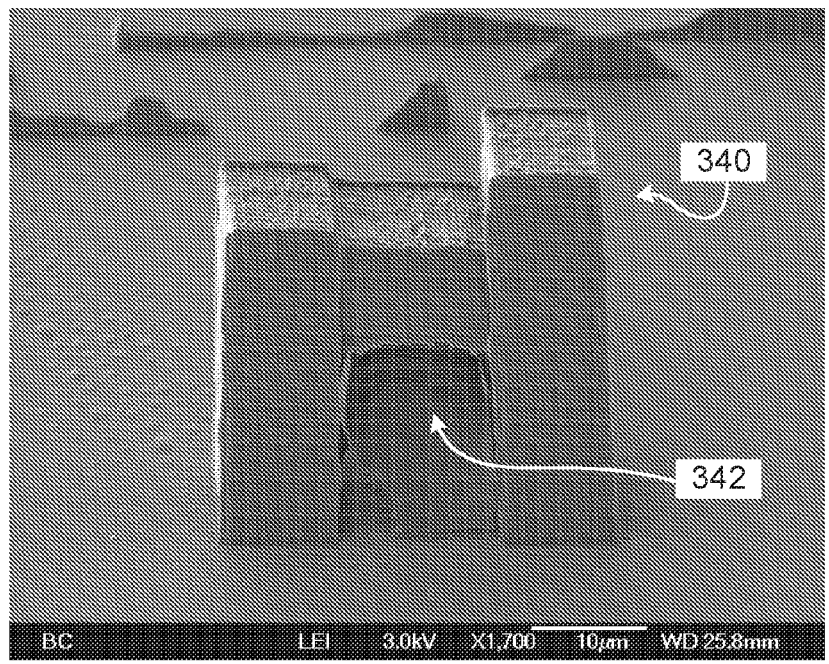
FIG. 8A is a scanning electron micrograph at 1700 times magnification of a replica in which a wall blocking a fluid flow pathway through the structure is partially replicated.
Figure 8B:
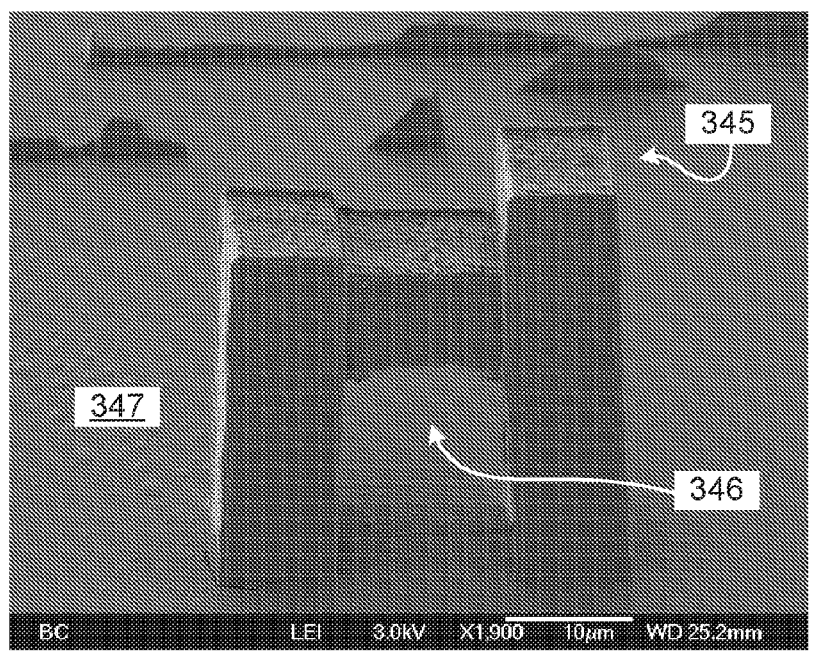
FIG. 8B is a scanning electron micrograph at 1900 times magnification of the replica of FIG. 8A after removal of the partially replicated blocking wall.

FIG. 8A is a scanning electron micrograph taken at 1700 times magnification of a master structure 340 having a wall 342 intend to block a fluid flow pathway. In this particular example, the wall had some imperfections and included some small holes. Nonetheless, a mold of the master structure was set and the master was released from the set mold without damaging the mold. The mold was then used to produce replica 345 shown in FIG. 8B, which is a scanning electron micrograph taken at 1900 times magnification. The replica 345 was cast from a mixture of ethoxylated trimethylolpropane triacrylate and tris(2-hydroxyethyl)isocyanurate in the presence of ethyl-2,4,6-trimethylbenzoyl-phenylphosphinate (Lucirin® TPO-L) as photo-initiator. Replication occurred without replication of blocking wall 342, which is an opening 346. Opening 346 is defined by a closed loop formed by replica 345 and base 347.

Figure 9A:
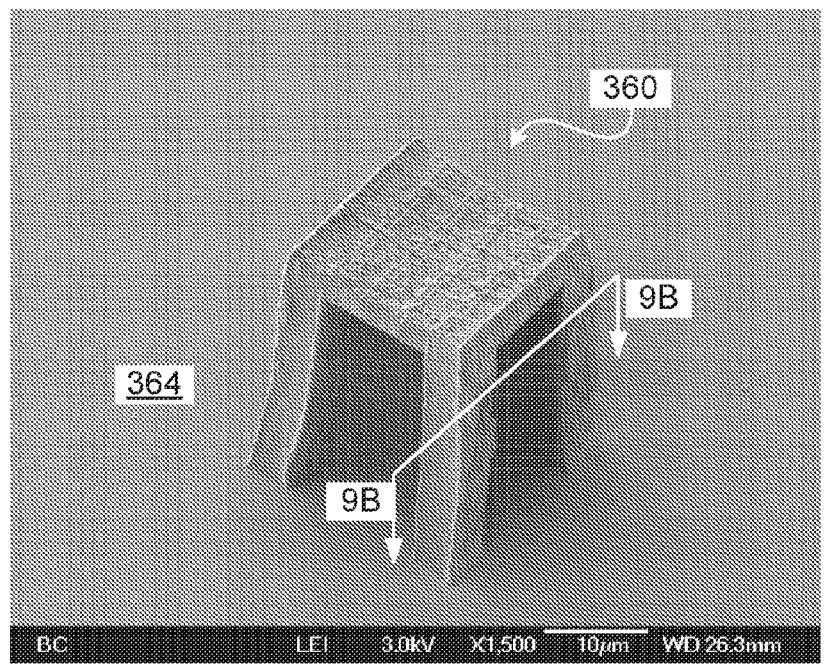
FIG. 9A is a scanning electron micrograph at 1500 times magnification of a stool-shaped master having interior walls blocking fluid flow pathways through the stool-shaped structure.
Figure 9C:
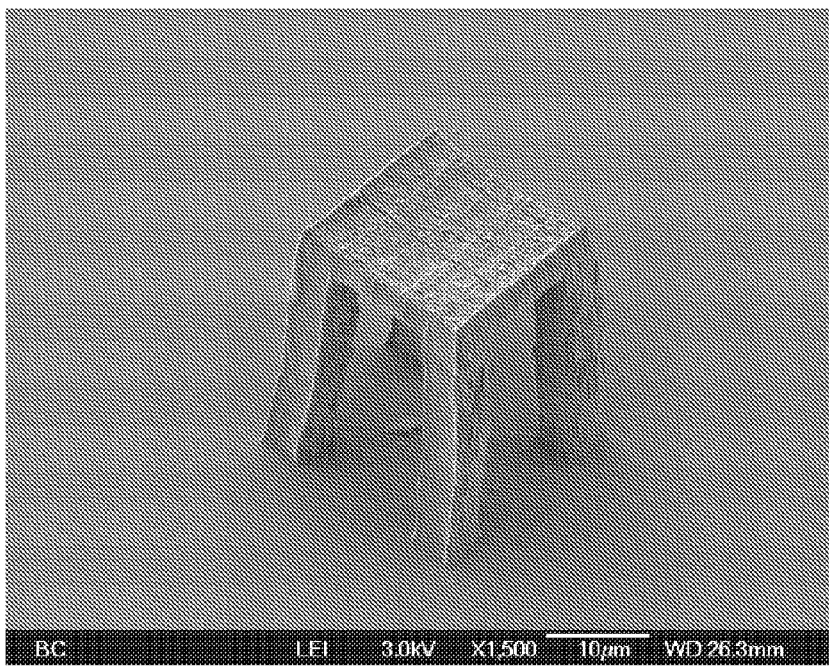
FIG. 9C is a scanning electron micrograph at 1500 times magnification of a replica of the stool-shaped master of FIG. 9A after walls have been removed.
Figure 9B:
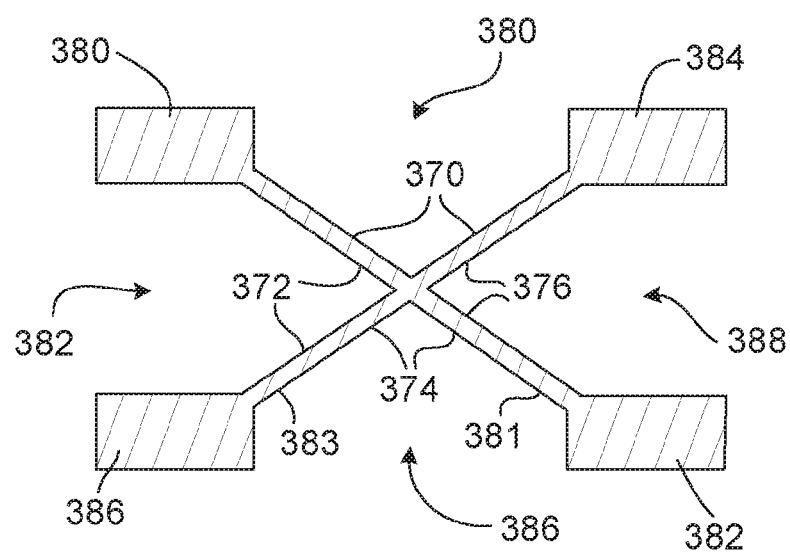
FIG. 9B is a cross-sectional view of the master of FIG. 9A, taken along 9B-9B.

FIG. 9A is a scanning electron micrograph taken at 1500 times magnification of a stool-shaped master 360 having interior walls blocking fluid flow pathways through the structure. Referring particularly to FIG. 9B, master 360 includes four walls 370, 372, 374 and 376 that block four fluid flow entrance ways 380, 382, 386 and 388. Walls 370, 372, 374 and 376 were formed from two intersecting diagonal membranes. The first diagonal membrane 381 connects legs 380 and 382, and the second diagonal membrane 383 connects legs 384 and 386 of the stool-shaped master 360. The membranes 381 and 383 of master 360 are each about 0.5 µm thick. FIG. 9C is a scanning electron micrograph taken at 1500 times magnification of a replica of the stool-shaped master 360, without replication of walls 370, 372, 374 and 376.

Referring to FIG. 10, a hook-shaped structure 400 extends outwardly from a base 402 and includes a head 404 that extends from a stem portion 406 to an engagement tip 410. Head 404 overhangs the base 402, forming an arched crook 409.

Attempting to create a mold from structure 400 to produce replicas can be problematic in that during production of the mold from master 400, liquid molding material flows into and through an open loop fluid flow pathway 412, defined by a surface 411 from point 409 to engagement tip 410. After the liquid molding material sets, fluid flow pathway 412 can create a mold-lock condition when an overhang distance (D), measured from an apex of the crook 408 to a forward-most extent of the head 421, is sufficiently large, e.g., 5 µm or more, e.g., 10 µm, 15 µm, 25 µm or 50 µm.

Referring to FIGS. 11A and 11B, master 401 has a fluid-blocking wall 420 that bisects the crook 409, preventing fluid flow under the crook 409 of the structure. Structure 400 can be produced from structure 401 by first making a mold from structure 401, and then adjusting replication conditions such that a region of the mold that produces the fluid-blocking wall 420 is not filled.

Figure 12A:
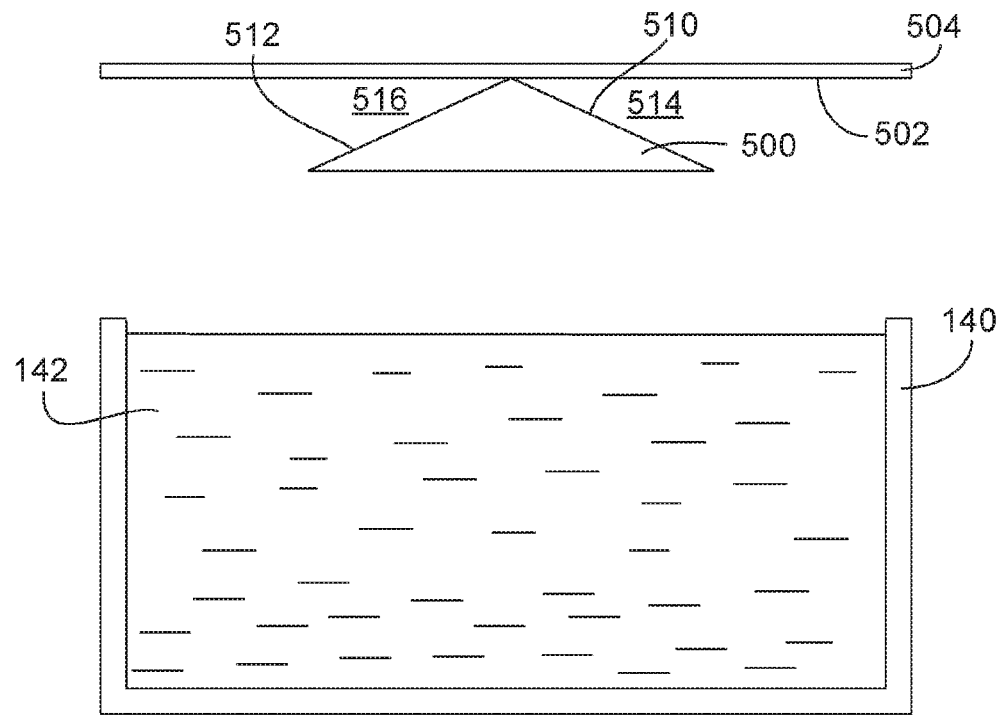
FIG. 12A is a schematic side view of a triangular structure extending from a base positioned above a molding material contained by a mold frame.
Figure 12B:
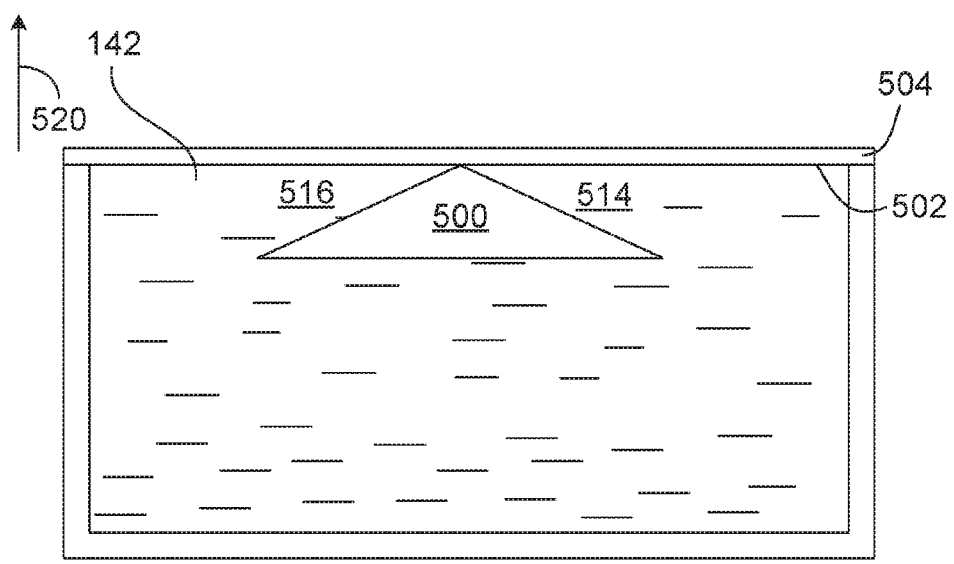
FIG. 12B is a schematic side view of the structure of FIG. 12A immersed in the molding material.

Referring to FIG. 12A, a triangular structure 500 positioned above a molding material 142 extends downwardly from and is integral with a front surface 502 of a base 504. Front surface 502, together with sides 510 and 512 form two open loop fluid flow pathways 514 and 516. Referring now to FIG. 12B, upon immersion of structure 500 into the unset, liquid molding material 142, the liquid molding material 142 flows into and through the open loop fluid flow paths 514 and 516. Upon solidification, mold-lock can occur, making it impossible to remove structure 500 from the set material by applying a force in an upwardly direction (indicated by arrow 520) without breaking the solid mold material or structure 520.

Figure 13A:
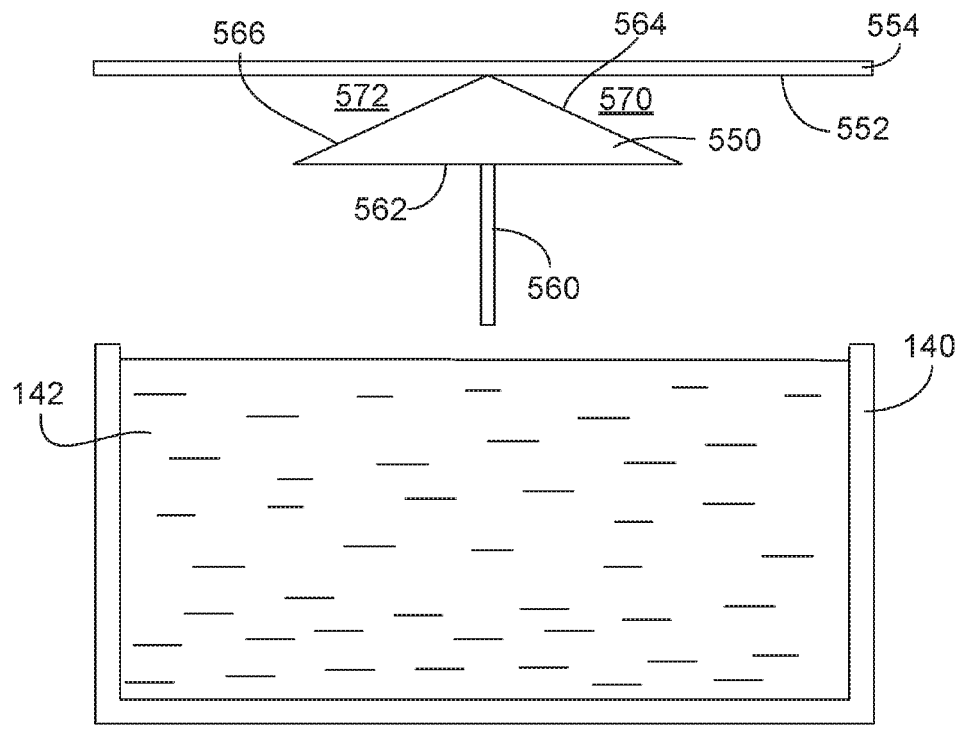
FIG. 13A is a schematic side view of a structure that includes a thin membrane positioned above a liquid molding material contained by a mold frame.
Figure 13B:
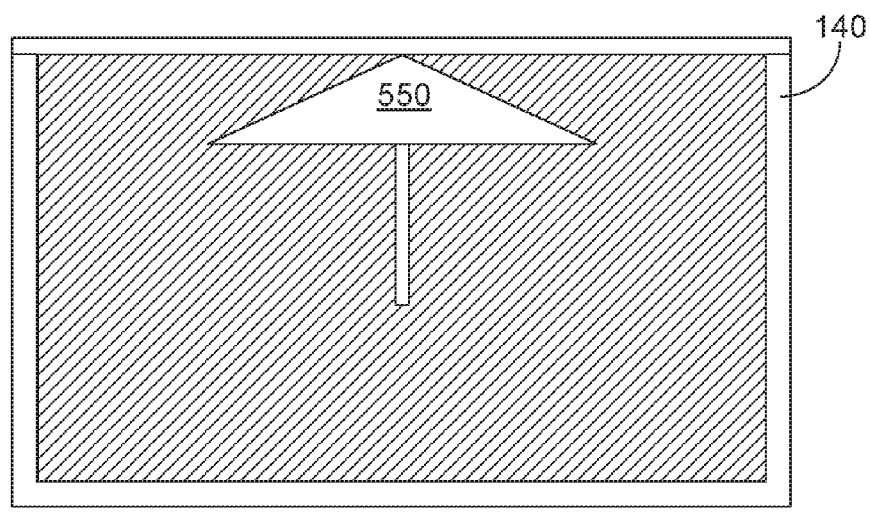
FIG. 13B is a schematic side view of the structure of FIG. 13A in a set molding material.

Referring to FIGS. 13A and 13B, a triangular structure 550 positioned above a molding material 142 extends downwardly from and is integral with a front surface 552 of a base 554. Structure 550 includes a membrane 560 extending away from a side 562 of structure 550. Front surface 552, together with sides 564 and 566 form two open loop fluid flow pathways 570 and 572. Upon immersion of structure 550 into the unset, liquid molding material 142, the liquid molding material 142 flows into and through open loop fluid flow paths 570 and 572.

Figure 13C:
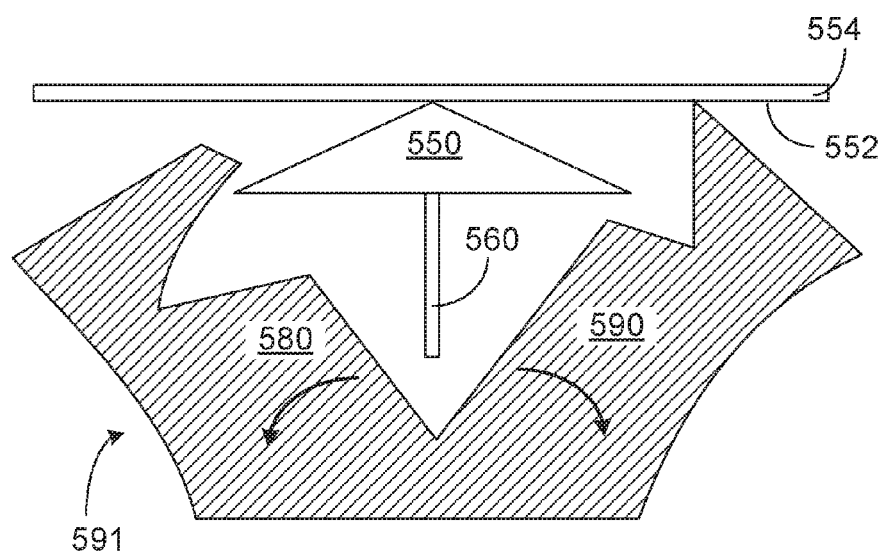
FIG. 13C is a schematic side view illustrating removal of the structure of FIGS. 13A and 13B from a mold.

Referring now to FIG. 13C, after removal of mold frame 140, membrane 560 of structure 550 assists in the removal of structure 550 from set molding material by permitting portions 580 and 590 of mold 591 on opposite sides of membrane 560 to flex away from one another when the structure is removed. Replicas can now be produced from the mold.

Replicas can be produced in which the membrane is replicated, producing structure 550, or structures can be produced in which the membrane is not replicated, producing structure 500. Methods for replicating membranes, or not replicating membranes were described above. Alternatively, structures devoid of membrane 560 can be produced by sonicating structures having membrane 560 to weaken an attachment of the membrane to structure, or by ablating the undesired membrane with a laser.

OTHER EMBODIMENTS

A number of embodiments of the invention have been described. Nevertheless, it will be understood that various modifications may be made without departing from the spirit and scope of the invention.

For example, while embodiments have been shown that have two blocking walls, embodiments can include any number of walls, e.g., one, three, four, five, six or more, e.g., ten.

While certain embodiments have been shown in which a blocking wall bisects a fluid flow pathway, in other embodiments, blocking walls may be positioned along any portion of the fluid flow pathway. For example, a blocking wall can be positioned at an end of a fluid flow pathway such that it is substantially co-planar with an outside surface of the structure.

While embodiments have been shown in which a single master extends outwardly from a base, in other embodiments, multiple masters, e.g., two, four, ten, twenty-five, fifty or more, e.g., one hundred masters, can each extend outwardly from a single base. In such embodiments, multiple replicas can be produced from a single molding of a single mold.

While certain embodiments have been described in which a replicating material is polyacrylate, other replicating materials are possible. For example, a pre-ceramic precursor polymer, e.g., a silicon-containing polymer, can be used. After replication and de-molding, the replica can be pyrolyzed to produce ceramic replicas, e.g., made of silicon carbide.

Accordingly, other embodiments are within the scope of the following claims.

What is claimed is:

1. A method for producing replicas of a desired structure, the method comprising:
    providing a master comprising the desired structure and additional structure different from the desired structure;
    immersing the master in a molding material;
    solidifying the molding material to make a mold of the master;
    removing the master from the mold, wherein the additional structure in the master assists in the removal of the master from the mold; and
    using the mold to produce the replicas of the desired structure but not the additional structure.

2. The method of claim 1, wherein the desired structure defines a fluid flow pathway and the additional structure comprises a membrane blocking the fluid flow pathway.

3. The method of claim 2, wherein the fluid flow pathway passes through the desired structure.

4. The method of claim 2, wherein the desired structure comprises a loop that defines the fluid flow pathway, and the membrane is configured to prevent the molding material from completely passing through the loop.

5. The method of claim 4, wherein the loop is a closed loop.

6. The method of claim 1, wherein the additional structure comprises a membrane extending away from the desired structure.

7. The method of claim 1, wherein the additional structure is a membrane that is thin compared to a thickness of the desired structure.

8. The method of claim 7, wherein the membrane has a thickness less than about 2 microns.

9. The method of claim 7, wherein a ratio of the thickness of the desired structure to that of the membrane is greater than about 5:1.

10. The method of claim 1, wherein the desired structure has a cross-sectional dimension less than about 50 microns.

11. The method of claim 1, wherein the master is removed from the mold along a first direction, and wherein the additional structure assists in the removal of the master from the mold by preventing the molding material from completely surrounding a portion of the desired structure in any plane including the first direction.

12. The method of claim 11, wherein the additional structure is a membrane preventing the molding material from completely passing through a loop in the desired structure.

13. The method of claim 12, wherein the additional structure assists in the removal of the master from the mold by permitting portions of the mold on opposite sides of the additional structure to flex away from one another when the master is removed from the mold.

14. The method of claim 1, wherein the master is removed from the mold along a first direction, and wherein the additional structure extends into the mold in a direction opposite the first direction.

15. The method of claim 14, wherein the additional structure assists in the removal of the master from the mold by permitting portions of the mold on opposite sides of the additional structure to flex away from one another when the master is removed from the mold.

16. The method of claim 1, wherein using the mold to produce the replicas comprises filling regions of the mold corresponding to the desired structure of the master with a replication material while not substantially filling regions of the mold corresponding to the additional structure of the master with the replication material.

17. The method of claim 16, wherein the regions of the mold corresponding to the desired structure are substantially larger than the regions of the mold corresponding to the additional structure, and wherein the replication material has viscosity that prevents the substantial filling of the regions of the mold corresponding to the additional structure.

18. The method of claim 17, wherein a ratio of a dimension of the desired structure to a dimension of the additional structure is greater than about 5:1.

19. The method of claim 1, wherein using the mold to produce the replicas further comprises filling selected regions of the mold with a replication material by applying a force to the mold to preferentially fill the selected regions.

20. The method of claim 19, wherein the selected regions of the mold correspond to the desired structure, and not the additional structure.

21. The method of claim 19, wherein the force is applied by using a vacuum.

22. The method of claim 19, wherein the force is applied by using a mechanical clamp.

23. A method for producing a replica of a desired structure, the method comprising:
providing a master comprising the desired structure and additional structure different from the desired structure;
immersing the master in a molding material;
solidifying the molding material to make a mold of the master;
removing the master from the mold, wherein the additional structure in the master assists in the removal of the master from the mold;
applying a force to selectively deform the mold; and
filling regions of the deformed mold with a replication material to produce a replica of the desired structure,
wherein the applied force is selected to control a thickness of a replica of the additional structure that is produced when the deformed mold is filled.

24. The method of claim 23, wherein the thickness of the replica of the additional structure is zero.

25. The method of claim 23, wherein the thickness of the replica of the additional structure is non-zero.

26. The method of claim 25, wherein the desired structure defines a fluid flow pathway and the additional structure comprises a membrane blocking the fluid flow pathway.

27. The method of claim 26, wherein the fluid flow pathway passes through the desired structure.

28. The method of claim 26, wherein the desired structure comprises a loop that defines the fluid flow pathway, and the membrane is configured to prevent the molding material from completely passing through the loop.

29. The method of claim 28, wherein the loop is a closed loop.

30. The method of claim 25, wherein the additional structure comprises a membrane extending away from the desired structure.

31. The method of claim 25, wherein the additional structure is a membrane that is thin compared to a thickness of the desired structure.

32. The method of claim 31, wherein the membrane has a thickness less than about 2 microns.

33. The method of claim 31, wherein a ratio of the thickness of the desired structure to that of the membrane is greater than about 5:1.

34. The method of claim 23, wherein the desired structure has a cross-sectional dimension less than about 50 microns.

35. The method of claim 25, wherein the master is removed from the mold along a first direction, and wherein the additional structure assists in the removal of the master from the mold by preventing the molding material from completely surrounding a portion of the desired structure in any plane including the first direction.

36. The method of claim 35, wherein the additional structure is a membrane preventing the molding material from completely passing through a loop in the desired structure.

37. The method of claim 36, wherein the additional structure assists in the removal of the master from the mold by permitting portions of the mold on opposite sides of the additional structure to flex away from one another when the master is removed from the mold.

38. The method of claim 25, wherein the master is removed from the mold along a first direction, and wherein the additional structure extends into the mold in a direction opposite the first direction.

39. The method of claim 38, wherein the additional structure assists in the removal of the master from the mold by permitting portions of the mold on opposite sides of the additional structure to flex away from one another when the master is removed from the mold.

40. The method of claim 25, wherein regions of the mold corresponding to the desired structure are substantially larger than regions of the mold corresponding to the additional structure, and wherein the replication material has viscosity that prevents substantial filling of the regions of the mold corresponding to the additional structure.

41. The method of claim 40, wherein a ratio of a dimension of the desired structure to a dimension of the additional structure is greater than about 5:1.

42. The method of claim 23, wherein the force is applied by using a vacuum.

43. The method of claim 23, wherein the force is applied by using a mechanical clamp.

* * * * *